United States Patent
Anumula et al.

(10) Patent No.: US 10,921,993 B2
(45) Date of Patent: *Feb. 16, 2021

(54) SUPPORTING MPIO FOR LOGICAL VOLUME BACKED VIRTUAL DISKS

(71) Applicant: International Business Machines Corporation, Armonk, NY (US)

(72) Inventors: Venkata N. S. Anumula, Hyderabad (IN); Sudhir Maddali, Hyderabad (IN); Sanket Rathi, Hyderabad (IN)

(73) Assignee: International Business Machines Corporation, Armonk, NY (US)

(*) Notice: Subject to any disclaimer, the term of this patent is extended or adjusted under 35 U.S.C. 154(b) by 31 days.

This patent is subject to a terminal disclaimer.

(21) Appl. No.: 16/247,680

(22) Filed: Jan. 15, 2019

(65) Prior Publication Data

US 2019/0146692 A1 May 16, 2019

Related U.S. Application Data

(63) Continuation of application No. 15/416,885, filed on Jan. 26, 2017, now Pat. No. 10,394,466.

(51) Int. Cl.
*G06F 12/00* (2006.01)
*G06F 3/06* (2006.01)
(Continued)

(52) U.S. Cl.
CPC ............ *G06F 3/0619* (2013.01); *G06F 3/067* (2013.01); *G06F 3/0617* (2013.01);
(Continued)

(58) Field of Classification Search
CPC .... G06F 3/0619; G06F 3/0644; G06F 3/0665; G06F 3/0689; G06F 9/5077; G06F 9/45533; G06F 2009/45579
See application file for complete search history.

(56) References Cited

U.S. PATENT DOCUMENTS 6,546,403 B1 * 4/2003 Carlson, Jr. ........ G06F 16/24532
7,784,049 B1 * 8/2010 Gandler .................. G06F 9/455
718/1
(Continued)

OTHER PUBLICATIONS

Configuring Virtual Disk Multipathing, Oracle®VMServer for SPARC 2.0 Administration Guide, http://docs.oracle.com/cd/E19608-01/html/821-1485/configuringvdiskmultipathing.html, 1 page. HOWTO: Disk Mapping to client from dual VIOS using VSCSI and MPIO,Unix Mantra, http://www.unixmantra.com/2013/05/howto-disk-mapping-to-client-from-dual-vios-mpio.html, pp. 1-3 Veritas Dynamic Multi-Pathing 6.0.1 Administrator's Guide—AIX, https://www.veritas.com/support/en_US/article.DOC5812, pp. 1-5.

(Continued)

*Primary Examiner* — Shawn X Gu
(74) *Attorney, Agent, or Firm* — Patterson + Sheridan, LLP

(57) ABSTRACT

Embodiments include systems, methods, and computer program products to perform an operation for enabling multipath I/O for logical volume backed virtual disks through redundant virtual I/O servers (VIOSs) on a computing system. The operation generally includes creating, from a physical storage device, a logical volume on a first VIOS. The logical volume on the first VIOS is activated in a first access mode. The operation also includes importing the logical volume to a second VIOS. The logical volume on the second VIOS is activated in a second access mode different from the first access mode. The operation further includes mapping the logical volume on the first and second VIOSs as a backing storage device for at least one logical partition hosted on the computing system.

20 Claims, 7 Drawing Sheets

(51) Int. Cl.
    *G06F 9/50*     (2006.01)
    *G06F 9/455*    (2018.01)
(52) U.S. Cl.
    CPC .......... *G06F 3/0644* (2013.01); *G06F 3/0665*
        (2013.01); *G06F 3/0689* (2013.01); *G06F*
        *9/5077* (2013.01); *G06F 9/45533* (2013.01);
                       *G06F 2009/45579* (2013.01)

(56)            References Cited

U.S. PATENT DOCUMENTS 8,495,412 B2 *   7/2013  Pafumi  ............... G06F 11/2005
                                                              714/4.1
    8,954,808 B1     2/2015  McLean et al.
    8,972,657 B1     3/2015  Armangau et al.
    10,394,466 B2 *  8/2019  Anumula ............. G06F 3/0619

OTHER PUBLICATIONS

HOWTO: Disk Mapping to client from dual VIOS using VSCSI and MPIO,Unix Mantra, http://www.unixmantra.com/2013/05/howto-disk-mapping-to-client-from-dual-vios-mpio.html, pp. 1-3.
Veritas Dynamic Multi-Pathing 6.0.1 Administrator's Guide—AIX, https://www.veritas.com/support/en_US/article.DOC5812, pp. 1-5.
Using LVM on Multipath (DM MPIO) Devices, http://www.novell.com/support/kb/doc.php?id=7007498,pp. 1-2.
IBM, "List of IBM Patents or Patent Applications Treated as Related," for U.S. Appl. No. 16/247,680, titled "Supporting MPIO for Logical Volume Backed Virtual Disks," as filed Jan. 15, 2019.

* cited by examiner

SUPPORTING MPIO FOR LOGICAL VOLUME BACKED VIRTUAL DISKS

CROSS-REFERENCE TO RELATED APPLICATIONS

This application is a continuation of co-pending U.S. patent application Ser. No. 15/416,885, filed Jan. 26, 2017, and issued as U.S. Pat. No. 10,394,466 on Aug. 27, 2019. The aforementioned related patent application is herein incorporated by reference in its entirety.

BACKGROUND

The present disclosure generally relates to techniques for storage virtualization, and more specifically, to techniques for supporting multipath input/output (I/O) (MPIO) for logical volume backed storage devices through redundant virtual I/O servers (VIOSs) on a client device.

In many cloud and virtualized environments, it is becoming increasingly important to provide near-continuous availability of resources in the environment. For example, as cloud environments move toward using low cost commodity hardware to support cloud infrastructures, providing high availability can reduce chances of an outage due to maintenance, hardware failures, etc. To provide high availability and redundancy, administrators often logically partition the resources of computing systems through virtualization. These resources can include processors, memory, I/O devices, storage, etc.

On a computing system, a firmware layer (e.g., a hypervisor) is used to expose virtualized computing hardware to different logical partitions (or virtual machines). Each logical partition can run a different operating system (OS). The hypervisor can provide each OS with a set of virtualized computing hardware. Referring in particular to I/O, a computing system may be provided with a special logical partition for I/O virtualization, referred to herein as a virtual I/O server (VIOS). A VIOS is generally configured to provide virtual I/O resources to the logical partitions of a computing system and enable shared access (by the logical partitions) to physical storage resources, e.g., disks, tape, optical media, etc. In some cases, a computing system can include multiple VIOSs to provide redundancy and multiple paths to the physical storage resources.

Storage virtualization, in general, can be implemented in different ways on different hypervisors. One example storage virtualization technique is virtual Small Computer Serial Interface (SCSI) based on a client-server relationship. With virtual SCSI, client logical partitions can share disk storage, tape, optical devices, etc., that are assigned to the VIOS logical partition. The VIOS owns the physical storage and acts as a storage server (or SCSI target device). The client logical partitions access the virtual SCSI backed physical storage devices provided by the VIOS as clients (or SCSI initiators). Examples of the backing storage devices include disks, logical volumes, files, etc.

SUMMARY

One embodiment presented herein includes a method for enabling MPIO for logical volume backed virtual disks through redundant VIOSs on a computing system. The method generally includes generally includes creating, from a physical storage device, a logical volume on a first VIOS. The logical volume on the first VIOS is activated in a first access mode. The method also includes importing the logical volume to a second VIOS. The logical volume on the second VIOS is activated in a second access mode different from the first access mode. The method further includes mapping the logical volume on the first and second VIOSs as a backing storage device for at least one logical partition hosted on the computing system.

Other embodiments include, without limitation, a computer program product that includes a storage medium having computer-readable program code that enables a processing unit to implement one or more aspects of the disclosed methods as well as a system having a processor, memory, and application programs configured to implement one or more of the disclosed methods.

DETAILED DESCRIPTION

Figure 1:
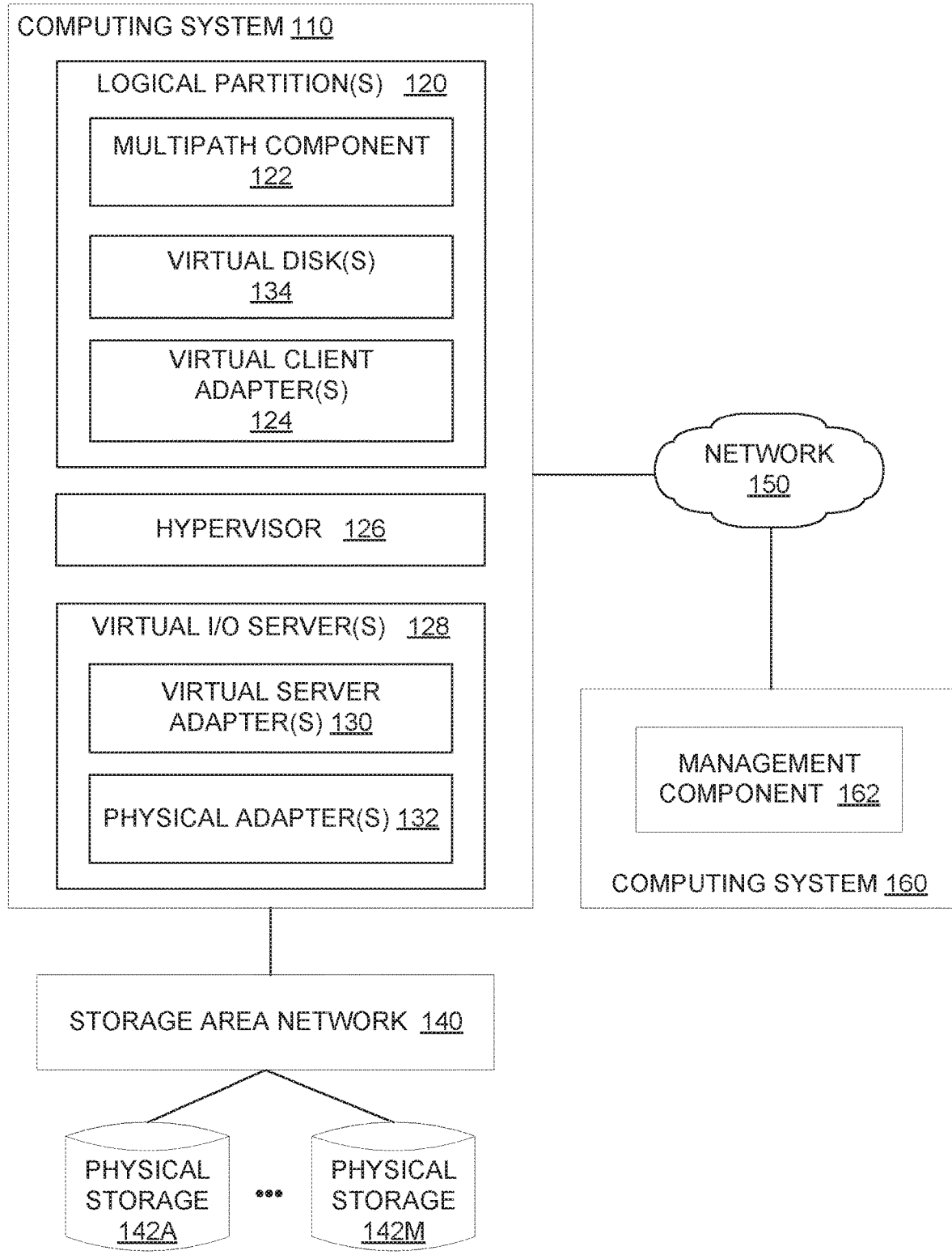
FIG. 1 illustrates an example computing environment configured to virtualize a logical volume from multiple VIOSs on a client computing system, according to one embodiment.

In many cases, logical volumes (i.e., a portion of a physical storage drive (or drives) exposed as an independent device) can be employed as backing storage devices for virtualized storage devices for clients. Administrators, for example, can use a logical volume backing device that spans across multiple physical disks to achieve a larger backing storage device. In another example, administrators can use a logical volume backing device that partitions one or more physical disks to achieve a smaller backing storage device. In addition, logical volume backing devices can grow and shrink dynamically. However, while logical volumes can be used as backing devices, it is typically not possible (e.g., with current techniques) to enable multipath I/O (MPIO) through redundant VIOSs with logical volumes as backing devices, because simultaneously accessing a logical volume as a virtual disk from multiple client partitions can cause inconsistency of the logical volume.

Embodiments presented herein provide techniques for virtualizing a logical volume from multiple virtual I/O servers (VIOSs) and providing multiple access routes through the VIOSs to the logical volume.

For example, a multipath component on a client computing system can be configured to create a volume group over a shared storage area network (SAN). The volume group, for example, may span over one or more physical disks. Once created, the multipath component can create one or more logical volumes on the volume group and import the logical volumes to multiple VIOSs on the same client computing system. The logical volumes can be used as backing storage devices for clients (e.g., virtual machine(s), logical partition(s), etc.) hosted on the client computing system. That is, the logical volumes can be used to back a virtual storage device (e.g., such as a virtual disk) on one or more clients. Further, as described below, the multipath component can be configured to identify (for a client) the same logical volume as a virtual disk (e.g., virtual small computer serial interface (SCSI) disk) via the multiple VIOSs and create multiple paths to the logical volume.

For example, assuming a client computing system is configured with two VIOSs, the multipath component can configure the path from the first VIOS to the logical volume as the active path and the path from the second VIOS to the logical volume as the inactive (or passive) path. The active path may be used for I/O operations (e.g., read/write access) and the inactive path may be used as a standby path (e.g., read only access). In this manner, the multipath component can enable MPIO to logical volume backed storage devices through multiple redundant VIOSs on a client computing system while preventing simultaneous access to the logical volume from the VIOSs.

Additionally, the multipath component can be configured to switch to one or more of the redundant passive paths in the event the active path fails. Continuing with the above example of two VIOSs, once the multipath component determines the active path (via the first VIOS) has failed, the multipath component can send a command (e.g., SCSI mode select command) to the first VIOS to switch the active path to a passive path, and send another command to the second VIOS to switch the inactive path to an active path. The client may then start accessing (e.g., performing read/write I/O operations) the logical volume via the active path from the second VIOS.

Note that many of the following embodiments refer to a computing system with two VIOSs as a reference example of a computing system with multiple redundant VIOSs that can be configured to provide MPIO for logical volume backed virtual disks. Those of ordinary skill in the art will recognize that the techniques presented herein can be applied to a computing system with any number of VIOSs.

FIG. 1 illustrates an example computing environment 100 configured to enable support for MPIO for logical volume backed storage devices through redundant VIOSs, according to one embodiment. As shown, the computing environment 100 includes a computing system 110 connected via network 150 to computing system 160. In general, the network 150 may be a wide area network (WAN), local area network (LAN), wireless LAN (WLAN), etc. In one embodiment, the network 150 is Ethernet. Each of the computing systems 110 and 160 can be any kind of physical computing system having a network interface, such as a desktop computer, laptop computer, mobile device, tablet computer, server computing system, and the like. The computing system 110 is also connected via the storage area network (SAN) 140 to one or more physical storage 142A-M. Examples of physical storage 142A-M include physical disks, external LUNS, tape drives, optical storage devices, tape storage devices, and the like.

The computing system 110 includes one or more logical partitions (LPARs) 120, a hypervisor 126, and one or more VIOS partitions 128. The computing system 110 may spawn, using the hypervisor 126, a number of LPARS 120 that can belong to a number of independent entities (e.g., enterprises, organizations, individual users, etc.). The hypervisor 126 is software and/or hardware that manages and executes the LPARs 120 (also referred to as virtual machines or VMs) in the computing system 110. The hypervisor 126 is generally an intermediary between the LPARs 120 and the hardware in the computing system 110. For example, the hypervisor 126 can manage physical resource allocation and access physical resources (e.g., such as processors, I/O, memory, etc.) on behalf of a given LPAR 120.

The LPAR 120 includes a multipath component 122, one or more virtual storage devices (e.g., virtual disk(s) 134), and virtual client adapter(s) 124. Each LPAR 120 hosted in the computing system 110 can run an independent operating system in order to execute one or more applications (or processes). Examples of operating systems include versions of the UNIX operating system (such as the AIX operating system), distributions of the Linux operating system, etc. (UNIX is a registered trademark of The Open Group in the United States and other countries, or both. Linux is a registered trademark of Linus Torvalds in the United States, other countries, or both). More generally, any operating system supporting the functions disclosed herein may be used.

The VIOS 128 is a partition that is generally configured to provide virtualized storage and/or network adapters to LPARs 120 in the computing system 110. For example, the VIOS 128 can allocate virtual I/O resources (e.g., virtual ports, virtual adapters, etc.) to LPARs 120 that the LPARs 120 can use to access the physical storage resources (e.g., physical storage 142A-M). The VIOS 128 can also be configured to virtualize the physical storage resources into one or more virtualized storage devices 134, such as virtual SCSI disk. The virtual storage devices 134 can be backed by physical disks, external LUNs, logical volumes, etc. As shown, the VIOS 128 includes virtual server adapter(s) 130 and physical adapter(s) 132. The VIOS 128 allows the LPAR 120 to connect to physical resources, e.g., such as the physical adapter(s) 132 and physical storage 142A-M on the SAN 140 via the virtual client adapter(s) 124 and virtual server adapter(s) 130. In one embodiment, the virtual client adapter(s) 124 includes virtual SCSI client adapters and the virtual server adapter(s) 130 include virtual SCSI server adapters. In one embodiment, the VIOS 128 and/or the computing system 160 can be configured to map (for the LPARs 120) the interaction between the virtual client adapters (e.g., on each LPAR 120) and the virtual server adapters. Once mapped, the multipath component 122 can be configured to provide a mapping between the virtual adapters and the physical storage.

The computing system 160 is generally configured to provide management functions for the computing system 110. In one embodiment, the computing system 160 is an example of a management console that can be used to configure and/or manage the resources within the computing system 110. One example of a management console is the Hardware Management Console (HMC) by International Business Machines®. The computing system 160 can use the management component 162 to configure and manage the physical and/or virtual resources in the computing system 110, monitor the operation of the resources, perform dynamic partitioning of the resources, activate and manage capacity on demand resources, assign addresses to the resources, and the like. The management component 162 can interact with the VIOS(s) 128, hypervisor 126 and/or LPAR(s) 120 to manage the physical and/or virtual resources. In one embodiment, the management component 162 provides an interface (e.g., a graphical user interface (GUI)) that allows a user (or administrator) to configure and/or manage resources within the computing system 110. In one embodiment, an administrator can interact with the computing system 160 remotely via the network 150 from another computing system (not shown).

As mentioned above, in cases where logical volumes are used to back the virtualized storage devices (e.g., virtual SCSI disk), it may not be possible to support MPIO through redundant VIOS for the logical volume backed devices, as data inconsistency issues can arise when multiple VIOS have access (e.g., read/write access) to the same logical volume.

As such, embodiments presented herein provide techniques for virtualizing a logical volume in order to enable MPIO through redundant VIOS while avoiding data inconsistency issues.

Figure 2:
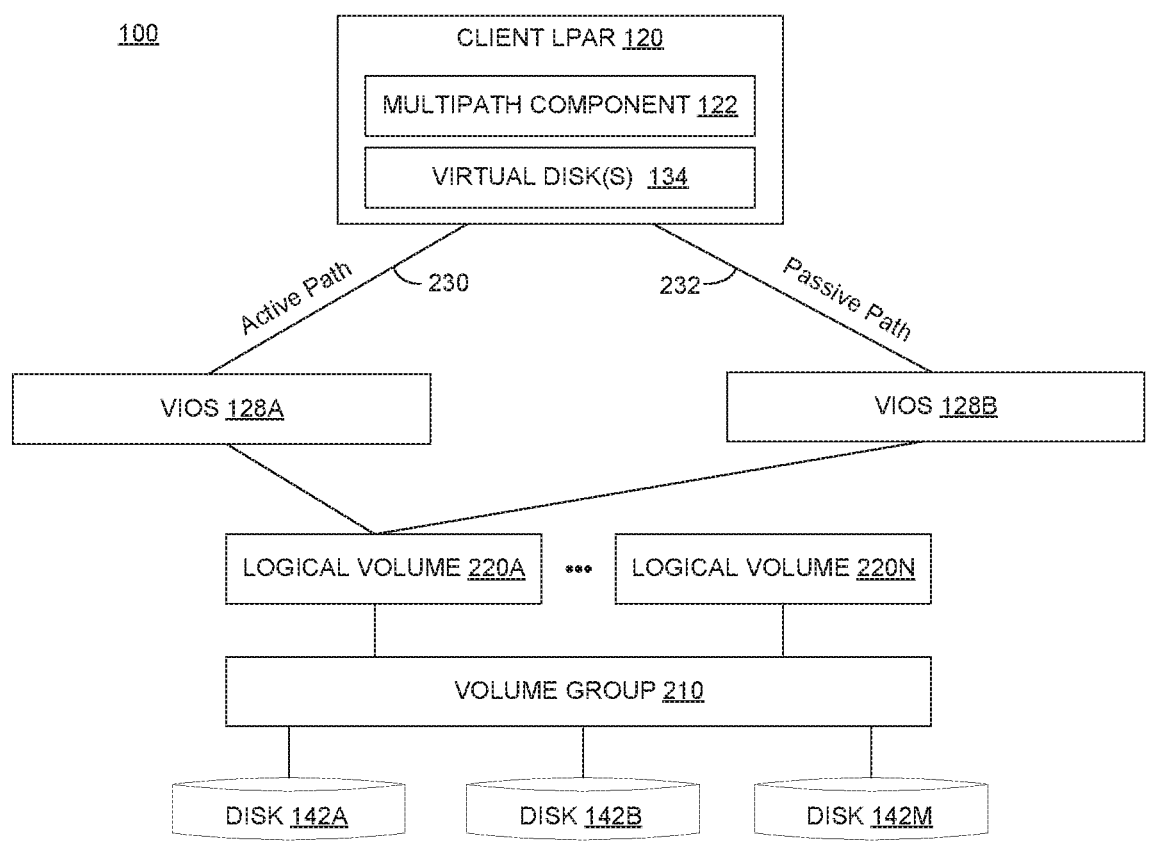
FIG. 2 illustrates an example configuration of a computing system configured to enable MPIO for logical volume backed storage devices through redundant VIOSs, according to one embodiment.

For example, the management component 162 within the computing system 160 can be configured to create multiple VIOSs for clients (e.g., LPARs 120) on the same computing system 110. The management component 162 can configure the mapping between the virtual I/O adapters in the LPARs 120 and the virtual I/O adapters in the multiple VIOSs. Once configured, the multipath component 122 can create a concurrent volume group over a shared SAN disk for a first VIOS (e.g., VIOS 128A) on the computing system 110 and activate the volume group in read/write mode for the first VIOS. The volume group may include one or more physical volumes, each of which can include a hard disk, portion of a hard disk, logical unit number (LUN), etc. For example, as shown in FIG. 2, the volume group 210 may include one or more disks 142A-M.

Once the volume group is created, the multipath component 122 can create logical volumes on the volume group. Referring again to FIG. 2, the multipath component 122 can create logical volumes 220A-220N on volume group 210. In one embodiment, one or more of the logical volumes 220 can span over multiple physical disks 142. In one embodiment, one or more of the logical volumes 220 can include a partition of a physical disk 142. The multipath component 122 can then import the volume group onto a second VIOS (e.g., VIOS 128B) on the computing system 110 and activate the volume group in read only mode for the second VIOS. The multipath component 122 can map (via the first VIOS) the logical volume(s) associated with the volume group as backing storage devices for virtual disk(s) 134 on the LPAR 120, and map (via the second VIOS) the same logical volume(s) as backing storage devices for the virtual disk(s) 134 on the LPAR 120.

Additionally, the multipath component 122 can enable the client (e.g., LPAR 120) to identify the same logical volume backed device via the multiple VIOS and create multiple paths to the logical volume backed device. For example, in one embodiment, the multipath component 122 can be configured to determine whether the same logical volume is being used to back the virtual disk from multiple VIOSs based on a logical volume identifier (LVID) associated with the logical volume. The LVID is generally a unique identifier associated with each logical volume backing device. As part of the device discovery protocol, the multipath component 122 can be configured to send an inquiry command (e.g., SCSI inquiry command) to the first and second VIOSs on the computing system 110. Each VIOS on the computing system 110 can be configured (e.g., by the multipath component 122 and/or management component 162) to emulate a device specific SCSI mode page for the logical volume backed devices that the multipath component 122 can use to set and/or retrieve configuration settings of the logical volume backed devices.

In response to the inquiry command, each VIOS can embed the LVID of the logical volume backing device in an inquiry response (e.g., SCSI inquiry response) and send the inquiry response to the multipath component 122. Once the multipath component 122 detects that the same LVID is received from both VIOS (e.g., the LVIDs match), the multipath component 122 can create multiple paths to the same logical volume backing device via the first and second VIOS (e.g., as part of its device discovery protocol). In one embodiment, to determine which of the paths is active/inactive, the multipath component 122 can send mode sense commands (e.g., SCSI mode sense commands) to each VIOS. Continuing with the example described above, if the first VIOS is configured for read/write access to the logical volume, the first VIOS can send a response indicating the path from the first VIOS to the logical volume is an active path (e.g., active path 230 in FIG. 2). Similarly, if the second VIOS is configured for read only access to the logical volume, the second VIOS can send a response indicating the path from the second VIOS to the logical volume is a passive (inactive) path (e.g., passive path 232 in FIG. 2).

In some embodiments, the multipath component 122 can be configured to switch paths in the event the multipath component 122 determines that an access operation to the logical volume via one of the paths fails.

Figure 3:
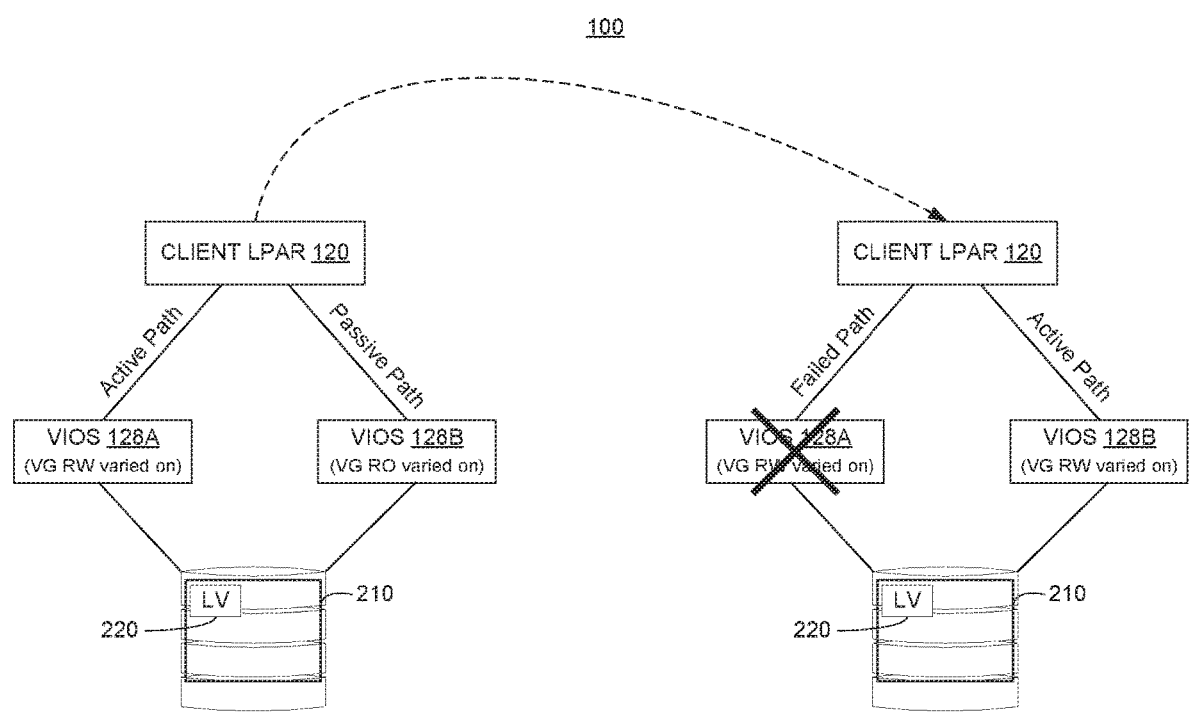
FIG. 3 illustrates an example of a computing system configured to switch one of multiple paths for accessing a logical volume during path failover, according to one embodiment.

FIG. 3 illustrates one example of a path failover scenario with logical volume backed virtual disks, according to one embodiment. As shown in FIG. 3, the multipath component 122 may initially create, for the LPAR 120, two different paths for accessing the logical volume 220. Once created, the LPAR 120 may use the active path via VIOS 128A for read/write I/O, and use the passive path via VIOS 128B for read only operations.

As further shown in FIG. 3, in some cases, if an I/O (via the active path) fails and all retries for the I/O fail, the multipath component 122 can send a mode select command (e.g., SCSI mode select command) to the first VIOS 128A via the active path to switch the active path to passive (e.g., read only mode). In some cases, if the first VIOS 128A is down, the command may be rejected (e.g., by the hypervisor 126). In such cases, the multipath component 122 may not have to switch the active path to passive as the first VIOS 128A is not accessing the logical volume. In some cases, if the first VIOS 128A is active, after sending the mode select command, the multipath component may receive a return message indicating that the first VIOS 128A has changed the permission (or configuration) of the volume group to read only. The multipath component 122 may also send a mode select command to the second VIOS 128B via the inactive path to switch the inactive path to active (e.g., read/write mode). Once switched, the client may start I/O via the new active path (e.g., via the second VIOS 128B). In this manner, the multipath component 122 can enable support for MPIO for logical volume backed disks. Note that while FIGS. 2 and 3 illustrate the logical volume backed storage devices as separate from the VIOSs in the computing system, in some embodiments, the logical volume backed storage device may be within each redundant VIOS.

Figure 4:
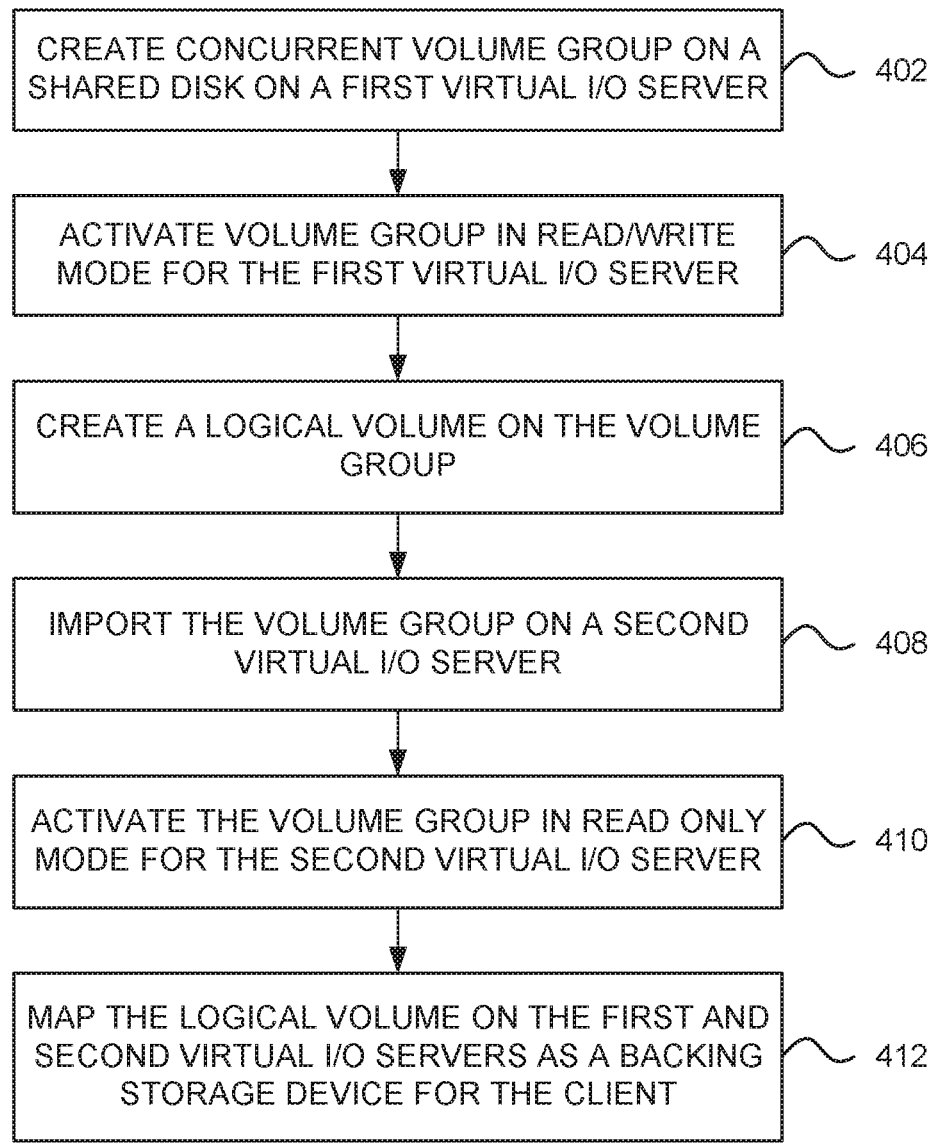
FIG. 4 is a flow chart illustrating a method for configuring a client to access a logical volume from multiple VIOSs on a computing system, according to one embodiment.

FIG. 4 is a flow chart illustrating a method 400 for configuring a client to access a logical volume from multiple VIOSs on a computing system, according to one embodiment. As shown, the method begins at block 402, where the multipath component 122 creates a concurrent volume group on a shared disk on a first VIOS (e.g., VIOS 128A) on a computing system (e.g., computing system 110). At block 404, the multipath component 122 activates the volume group in read/write mode for the first VIOS. At block 406, the multipath component 122 creates a logical volume on the volume group. At block 408, the multipath component 122 imports the volume group on a second VIOS (e.g., VIOS 128B) on the computing system. For example, in one embodiment, the importvg command can be used to import the volume group to the second VIOS. At block 410, the multipath component 122 activates the volume group in read only mode for the second VIOS. At block 412, the multipath component 122 maps the logical volume on the first and second VIOSs as a backing storage device for the client (e.g., LPAR 120) on the computing system.

Figure 5:
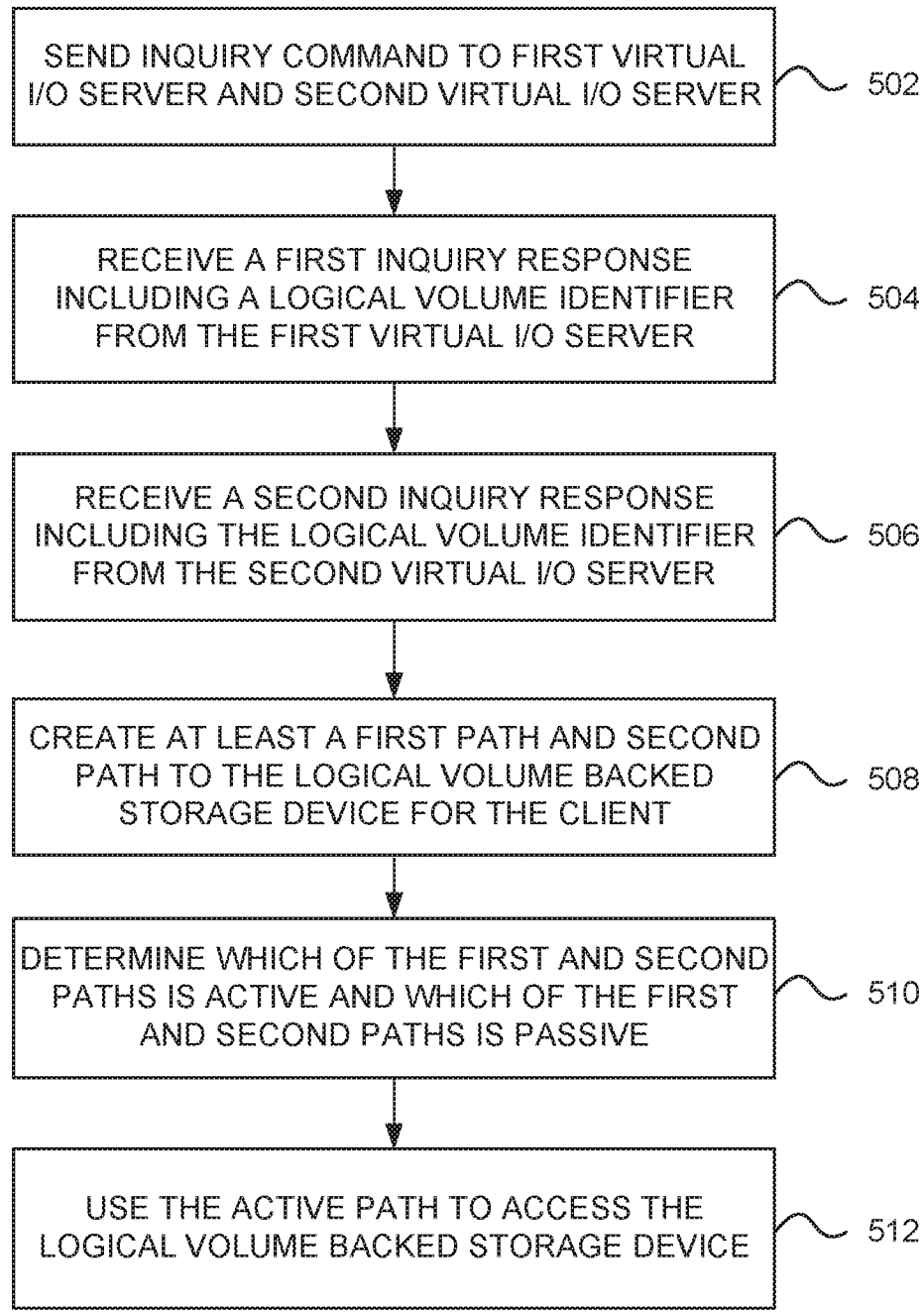
FIG. 5 is a flow chart illustrating a method for identifying and creating multipath paths to a logical volume backed device via multiple VIOSs on a computing system, according to one embodiment.

FIG. 5 is a flow chart illustrating a method 500 for creating multipath paths to a logical volume backed device via multiple VIOSs on a computing system, according to one embodiment. As shown, the method begins at block 502, where the multipath component 122 sends an inquiry command to the first VIOS (e.g., VIOS 128A) and second VIOS (e.g., VIOS 128B). At 504, the multipath component 122 receives a first inquiry response that includes a logical volume identifier from the first VIOS. The embedded logical volume identifier may correspond to a unique identifier of the logical volume mapped via the first VIOS as a backing device for the client. At 506, the multipath component 122 receives a second inquiry response that includes the logical volume identifier from the second VIOS. The logical volume identifier from the second VIOS may correspond to the unique identifier of the logical volume mapped via the second VIOS as a backing device for the client.

When the client performs device discovery (e.g. in order to discover and connect to the virtual disk), the multipath component 122 can determine whether the virtual disk is backed by the same logical volume (via the multiple VIOSs), based on the logical volume identifiers received from the inquiry responses. For example, if the logical volume identifiers are the same, the multipath component 122 may determine that the same logical volume is accessible via the multiple VIOSs, and, at 508, create at least a first path and second path to the logical volume backed storage device for the client.

In one embodiment, the multipath component 122 can also identify (for the client) which paths are active/inactive, based on one or more responses to mode sense commands. For example, the multipath component 122 can send a mode sense command to the first VIOS and the second VIOS. In response to the mode sense command, the first VIOS and second VIOS may send responses indicating their respective access configurations (or permissions) for the logical volume. For example, if the first VIOS is configured for read/write access to the logical volume, the first VIOS may send a response that indicates the path via the first VIOS is an active path. Similarly, if the second VIOS is configured for read only access to the logical volume, the second VIOS may send a response that indicates the path via the second VIOS is an inactive path. Once the path settings are determined, at block 512, the multipath component 122 may use the active path to access (e.g., perform read/write I/O) the logical volume backed storage device.

Figure 6:
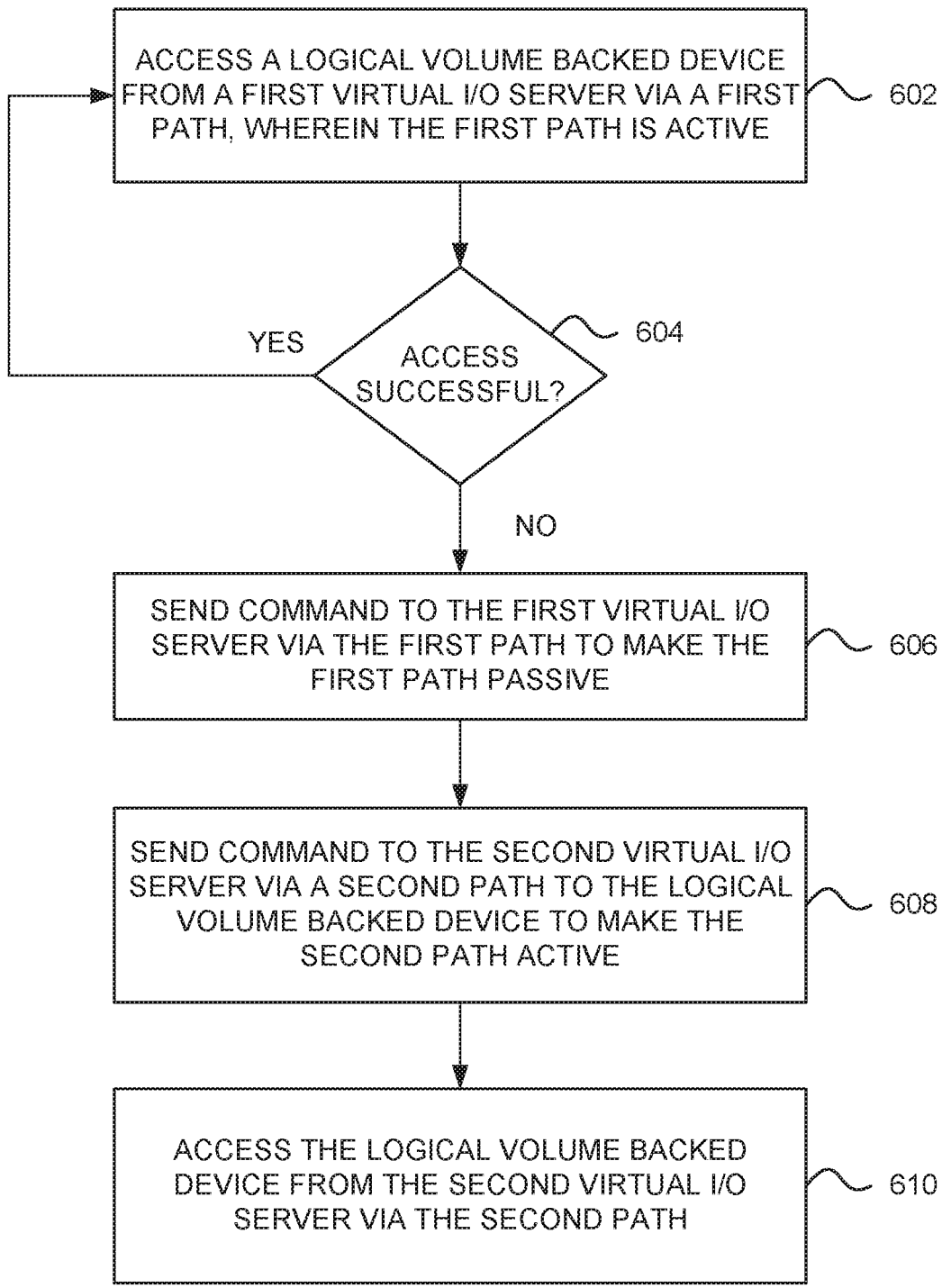
FIG. 6 is a flow chart illustrating a method for switching one of multiple paths used to access a logical volume, according to one embodiment.

FIG. 6 is a flow chart illustrating a method 600 for switching one of multiple paths used to access a logical volume, according to one embodiment. As shown, the method 600 begins at block 602 where the client (e.g., LPAR 120) accesses a logical volume backed device from a first VIOS (e.g., VIOS 128A) via a first path that is active (e.g., path 230). At block 604, the multipath component 122 determines if the access to the logical volume backed device is successful. That is, if a write I/O was performed, the multipath component 122 determines if the write I/O failed. If the access is successful, the client may continue accessing the logical volume backed device via the first VIOS. On the other hand, if the access is not successful, the multipath component 122 can switch the first path from an active state to a standby state. In one embodiment, the multipath sends a command (e.g., mode select command) to the first VIOS via the first path to make the first path passive (block 606) (i.e., switch the first path from an active state to a standby state). The mode selected command, for example, may change a configuration of the logical volume (or volume group) on the first VIOS to read only mode.

As noted above, in some cases, if the first VIOS is down, the multipath component 122 may not receive a response to the mode select command (e.g., the hypervisor may reject the command). In such cases, the multipath component 122 may not have to make the first path inactive since the first VIOS is not accessing the logical volume. On the other hand, if the first VIOS is active, the multipath component 122 may receive a response indicating the first VIOS has changed the permission of the volume group to read only.

At block 608, the multipath component 122 sends a command to the second VIOS via a second path (to the logical volume backed device) to make the second path active (e.g., switch the second path from a standby state to an active state). The command sent to the second VIOS, for example, may change a configuration (or permission) of the logical volume on the second VIOS to read/write mode. At block 610, the client may then access the logical volume backed device from the second VIOS via the second path. Advantageously, the techniques presented herein allow computing devices to provide MPIO for logical volume backed virtual disks exported from different VIOS, which may provide high availability for a logical volume backed virtual disk configuration.

Figure 7:
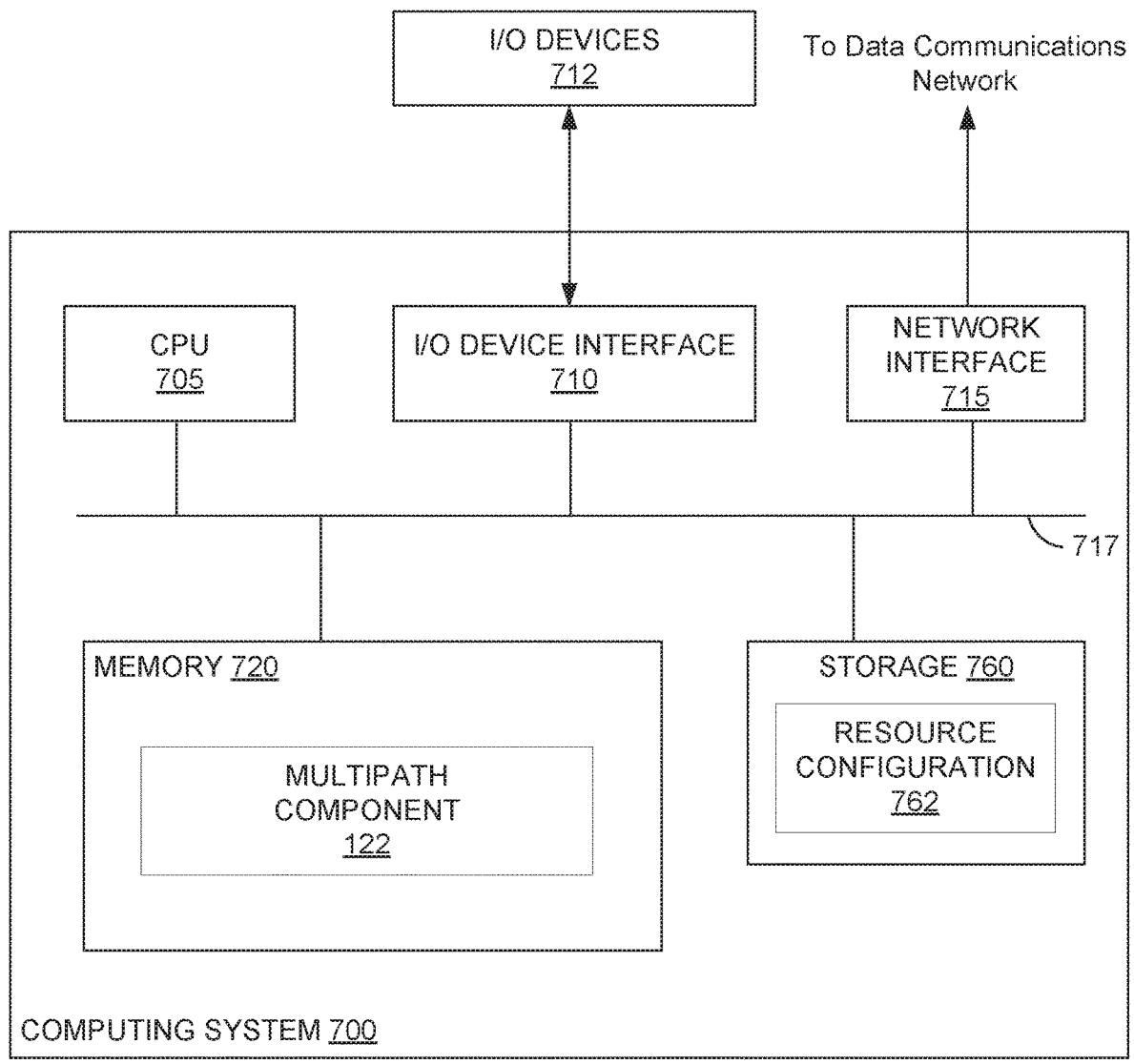
FIG. 7 is a block diagram illustrating a computing system configured to provide support for MPIO for logical volume backed storage devices through redundant VIOSs on the computing system, according to one embodiment.

FIG. 7 illustrates a computing system 700 configured to provide MPIO for logical volume backed storage devices through redundant VIOSs on the computing system 700, according to one embodiment. As shown, the computing system 700 includes, without limitation, a central processing unit (CPU) 705, a network interface 715, a memory 720, and storage 760, each connected to a bus 717. The computing system 700 may also include an I/O device interface 710 connecting I/O devices 712 (e.g., keyboard, mouse, and display devices) to the computing system 700. Further, in context of this disclosure, the computing elements shown in the computing system 700 may correspond to a physical computing system (e.g., a system in a data center) or may be a virtual computing instance executing within a computing cloud.

The CPU 705 retrieves and executes programming instructions stored in the memory 720 as well as stores and retrieves application data residing in the memory 720. The interconnect 717 is used to transmit programming instructions and application data between CPU 705, I/O devices interface 710, storage 760, network interface 715, and memory 720. Note CPU 705 is included to be representative of a single CPU, multiple CPUs, a single CPU having multiple processing cores, and the like. Memory 720 is generally included to be representative of a random access memory. The storage 760 may be a disk drive storage device. Although shown as a single unit, storage 760 may be a combination of fixed and/or removable storage devices, such as fixed disc drives, removable memory cards, or optical storage, network attached storage (NAS), or a storage area-network (SAN). The storage 760 includes resource configuration information 762. Illustratively, the memory 720 includes a multipath component 122, which is described in more detail above.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., multipath component 122, management component 162, etc.) or related data available in the cloud. For example, the multipath component 122 could execute on a computing system in the cloud, and map the logical volume on multiple VIOSs as a backing storage device for a client. Once mapped, the multipath component 122 can create multiple paths to the logical volume via the multiple VIOSs. One of paths may be used to perform read/write operations and the other paths may be used as standby passive paths. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
    creating, from a physical storage device, a logical volume for a first virtual input/output server (VIOS);
    activating the logical volume for a second VIOS; and
    mapping, via the first VIOS and the second VIOS, the logical volume as a backing storage device for at least one logical partition hosted on a computing system.

2. The method of claim 1, further comprising:
    creating, from the at least one logical partition, a first path to the logical volume via the first VIOS and a second path to the logical volume via the second VIOS;
    using the first path for accessing the logical volume; and
    using the second path for standby access to the logical volume.

3. The method of claim 2, wherein creating the first and second paths comprise:
    sending a first command to the first VIOS and the second VIOS to identify logical storage devices on the first and second VIOSs;
    after sending the first command, receiving a response from the first VIOS that includes a first logical volume identifier for the logical volume and a response from the second VIOS that includes a second logical volume identifier for the logical volume; and
    upon determining that the first logical volume identifier matches the second logical volume identifier, identifying that the logical volume via the first and second VIOSs is used as a same backing storage device for the at least one logical partition on the computing system.

4. The method of claim 3, further comprising:
    sending a second command to the first VIOS and the second VIOS to determine a configuration of the first path and second path;
    determining that the first path is configured for at least one of read access and write access to the logical volume based on a response to the second command from the first VIOS; and
    determining that the second path is configured for read only access to the logical volume based on a response to the second command from the second VIOS.

5. The method of claim 2, further comprising:
    upon determining that an operation to access the logical volume via the first path has failed:
        switching the first path from an active state to a standby state; and
        switching the second path from a standby state to an active state; and
    performing read and write operations that access the logical volume from the second path.

6. The method of claim 1, wherein the first VIOS and the second VIOS are activated in a same access mode to the logical volume.

7. The method of claim 1, wherein the physical storage device comprises one or more physical disks, and wherein the logical volume comprises a plurality of the physical disks.

8. A system, comprising:
a processor; and
a memory storing one or more instructions which, when executed by the processor, perform an operation comprising:
creating, from a physical storage device, a logical volume for a first virtual input/output server (VIOS);
activating the logical volume for a second VIOS; and
mapping, via the first VIOS and the second VIOS, the logical volume as a backing storage device for at least one logical partition hosted on the system.

9. The system of claim 8, the operation further comprising:
creating, from the at least one logical partition, a first path to the logical volume via the first VIOS and a second path to the logical volume via the second VIOS;
using the first path for accessing the logical volume; and
using the second path for standby access to the logical volume.

10. The system of claim 9, wherein creating the first and second paths comprise:
sending a first command to the first VIOS and the second VIOS to identify logical storage devices on the first and second VIOSs;
after sending the first command, receiving a response from the first VIOS that includes a first logical volume identifier for the logical volume and a response from the second VIOS that includes a second logical volume identifier for the logical volume; and
upon determining that the first logical volume identifier matches the second logical volume identifier, identifying that the logical volume via the first and second VIOSs is used as a same backing storage device for the at least one logical partition on the system.

11. The system of claim 10, the operation further comprising:
sending a second command to the first VIOS and the second VIOS to determine a configuration of the first path and second path;
determining that the first path is configured for at least one of read access and write access to the logical volume based on a response to the second command from the first VIOS; and
determining that the second path is configured for read only access to the logical volume based on a response to the second command from the second VIOS.

12. The system of claim 11, the operation further comprising:
upon determining that an operation to access the logical volume via the first path has failed:
switching the first path from an active state to a standby state; and
switching the second path from a standby state to an active state; and
performing read and write operations that access the logical volume from the second path.

13. The system of claim 8, wherein the first VIOS and the second VIOS are activated in a same access mode to the logical volume.

14. The system of claim 8, wherein the physical storage device comprises one or more physical disks, and wherein the logical volume comprises a plurality of the physical disks.

15. A computer program product, comprising:
a computer-readable storage medium having computer-readable program code embodied therewith, the computer-readable program code executable by one or more computer processors to perform an operation comprising:
creating, from a physical storage device, a logical volume for a first virtual input/output server (VIOS);
activating the logical volume for a second VIOS; and
mapping, via the first VIOS and the second VIOS, the logical volume as a backing storage device for at least one logical partition hosted on a computing system.

16. The computer program product of claim 15, the operation further comprising:
creating, from the at least one logical partition, a first path to the logical volume via the first VIOS and a second path to the logical volume via the second VIOS;
using the first path for accessing the logical volume; and
using the second path for standby access to the logical volume.

17. The computer program product of claim 16, wherein creating the first and second paths comprise:
sending a first command to the first VIOS and the second VIOS to identify logical storage devices on the first and second VIOSs;
after sending the first command, receiving a response from the first VIOS that includes a first logical volume identifier for the logical volume and a response from the second VIOS that includes a second logical volume identifier for the logical volume; and
upon determining that the first logical volume identifier matches the second logical volume identifier, identifying that the logical volume via the first and second VIOSs is used as a same backing storage device for the at least one logical partition on the computing system.

18. The computer program product of claim 17, the operation further comprising:
sending a second command to the first VIOS and the second VIOS to determine a configuration of the first path and second path;
determining that the first path is configured for at least one of read access and write access to the logical volume based on a response to the second command from the first VIOS; and
determining that the second path is configured for read only access to the logical volume based on a response to the second command from the second VIOS.

19. The computer program product of claim 16, the operation further comprising:
upon determining that an operation to access the logical volume via the first path has failed:
switching the first path from an active state to a standby state; and
switching the second path from a standby state to an active state; and
performing read and write operations that access the logical volume from the second path.

20. The computer program product of claim 15, wherein the physical storage device comprises one or more physical disks, and wherein the logical volume comprises a plurality of the physical disks.

* * * * *